US010598061B2

(12) United States Patent
Dobson et al.

(10) Patent No.: US 10,598,061 B2
(45) Date of Patent: *Mar. 24, 2020

(54) METHODS AND SYSTEMS FOR A DIESEL OXIDATION CATALYST

(71) Applicant: Ford Global Technologies, LLC, Dearborn, MI (US)

(72) Inventors: Douglas Allen Dobson, Ypsilanti, MI (US); Timothy Brian Chanko, Canton, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/466,678

(22) Filed: Mar. 22, 2017

(65) Prior Publication Data

US 2018/0274413 A1    Sep. 27, 2018

(51) Int. Cl.
*F01N 3/02* (2006.01)
*F01N 3/10* (2006.01)
(Continued)

(52) U.S. Cl.
CPC ....... *F01N 3/0231* (2013.01); *B01D 46/0061* (2013.01); *B01D 53/944* (2013.01);
(Continued)

(58) Field of Classification Search
CPC .... B01D 2255/1023; B01D 2255/2065; B01D 2255/2073; B01D 2255/20746; B01D 2255/20761; B01D 2255/20769; B01D 2255/20776; B01D 2255/9022; B01D 2255/904; B01D 2273/18; B01D 46/0061; B01D 53/9477; B01D 53/9495; B01J 23/64; F01N 2510/06; F01N 2900/1404; F01N 2900/1606; F01N 3/021; F01N 3/0231;
(Continued)

(56) References Cited

U.S. PATENT DOCUMENTS

| 4,902,487 A | 2/1990 | Cooper et al. |
| 6,013,599 A | 1/2000 | Manson |

(Continued)

FOREIGN PATENT DOCUMENTS

| CN | 102631932 A | 8/2012 |
| EP | 1541219 A | 6/2005 |

OTHER PUBLICATIONS

Dobson, Douglas Allen, "Methods and Systems for a Diesel Oxidation Catalyst," U.S. Appl. No. 15/466,721, filed Mar. 22, 2017, 54 pages.

(Continued)

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for a diesel oxidation catalyst. In one example, the diesel oxidation catalyst comprises a washcoat with different catalytically active portions for reacting with one or more of carbon containing compounds and $NO_x$. The diesel oxidation catalyst is located upstream of a particulate filter in an exhaust passage.

16 Claims, 6 Drawing Sheets

(51) Int. Cl.
*F01N 3/20* (2006.01)
*F01N 3/021* (2006.01)
*F01N 3/023* (2006.01)
*F02D 41/14* (2006.01)
*B01J 23/89* (2006.01)
*B01D 53/94* (2006.01)
*B01D 46/00* (2006.01)
*B01J 23/64* (2006.01)
*F01N 9/00* (2006.01)
*F02D 41/02* (2006.01)

(52) U.S. Cl.
CPC .......... *B01D 53/9495* (2013.01); *B01J 23/64* (2013.01); *B01J 23/8986* (2013.01); *F01N 3/021* (2013.01); *F01N 3/106* (2013.01); *F01N 3/2066* (2013.01); *F01N 9/002* (2013.01); *F02D 41/029* (2013.01); *F02D 41/1454* (2013.01); *B01D 53/9477* (2013.01); *B01D 2255/1023* (2013.01); *B01D 2255/2065* (2013.01); *B01D 2255/2073* (2013.01); *B01D 2255/20715* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/904* (2013.01); *B01D 2255/9022* (2013.01); *B01D 2255/9032* (2013.01); *B01D 2273/18* (2013.01); *F01N 2510/06* (2013.01); *F01N 2900/1404* (2013.01); *F01N 2900/1606* (2013.01); *F02D 41/1446* (2013.01); *F02D 41/1448* (2013.01); *F02D 2200/0802* (2013.01); *Y02A 50/2325* (2018.01); *Y02T 10/47* (2013.01)

(58) Field of Classification Search
CPC ........ F01N 3/106; F01N 3/2066; F01N 9/002; F02D 2200/0802; F02D 41/029; F02D 41/1446; F02D 41/1448; F02D 41/1454; Y02A 50/2325; Y02T 10/47
See application file for complete search history.

(56) References Cited

U.S. PATENT DOCUMENTS

| | | | |
|---|---|---|---|
| 6,557,340 B1 | 5/2003 | Twigg et al. | |
| 6,813,884 B2* | 11/2004 | Shigapov | B01D 53/9418 60/274 |
| 6,843,055 B2 | 1/2005 | Ootake | |
| 7,138,753 B2* | 11/2006 | Chen | H01J 9/185 313/310 |
| 7,329,627 B2 | 2/2008 | Wanninger et al. | |
| 7,412,822 B2 | 8/2008 | Zhan et al. | |
| 7,631,488 B2 | 12/2009 | Chung et al. | |
| 7,666,376 B2 | 2/2010 | Dornseiffer et al. | |
| 8,043,572 B2 | 10/2011 | Cheng | |
| 8,304,366 B2* | 11/2012 | Drews | B01D 53/944 502/327 |
| 8,404,201 B2 | 3/2013 | Qi et al. | |
| 8,778,831 B2* | 7/2014 | Southward | B01D 53/944 423/239.1 |
| 8,844,271 B2 | 9/2014 | Huber et al. | |
| 2004/0018939 A1 | 1/2004 | Cigapov et al. | |
| 2008/0045405 A1* | 2/2008 | Beutel | B01J 23/44 502/103 |
| 2009/0257935 A1 | 10/2009 | Southward et al. | |
| 2011/0099975 A1* | 5/2011 | Bailey | B01D 53/944 60/274 |
| 2011/0165046 A1 | 7/2011 | Drews et al. | |
| 2011/0283680 A1* | 11/2011 | Gekas | B01D 53/944 60/274 |
| 2012/0060477 A1* | 3/2012 | Alm | F01N 3/023 60/274 |
| 2014/0291250 A1 | 10/2014 | Arena et al. | |

OTHER PUBLICATIONS

Zhang, Xue, et al., Abstract of "Ceramic Monolith Supported Mn—Ce—M Ternary Mixed-Oxide (M=Cu, Ni or Co) Catalyst for VOCs Catalytic Oxidation," Ceramics International, 2016, vol. 42, No. 15, 1 page.

* cited by examiner

METHODS AND SYSTEMS FOR A DIESEL OXIDATION CATALYST

FIELD

The present description relates generally to methods and systems a diesel oxidation catalyst (DOC) having a combination of precious metal and base metal compounds.

BACKGROUND/SUMMARY

A diesel oxidation catalyst (DOC) may readily oxidize NO to $NO_2$ for treatment at an SCR or to promote regeneration of a particulate filter. One or more platinum group metals (e.g., Pt, Pd, Rh, etc.) are coupled to a substrate of the DOC and promote formation of $NO_2$ while affording the added characteristic of low light-off temperatures. However, DOCs comprising high amounts of platinum group metals may experience degradation following a threshold number of miles of vehicle operation, thereby limiting its $NO_2$ production capabilities.

Other attempts to address $NO_2$ generation include DOCs with a composition including a combination of one or more platinum group metals with one or more base metal oxides. One example approach is shown by Cooper et al. in U.S. Pat. No. 4,902,487. Therein, a precious metal (e.g., a platinum group metal), such as platinum, is coated onto a ceramic honeycomb substrate. The catalyst is configured to catalyze NO into $NO_2$ in the presence of $O_2$. A particulate filter comprising one or more of a base metal oxides and/or $La/Cs/V_2O_5$ is located downstream of the catalyst. As such, the particulate filter may achieve lower regeneration temperatures in the presence of $NO_2$ generated by the catalyst.

However, the inventors herein have recognized potential issues with such systems. As one example, $NO_2$ generating catalyst may be bypassed if sulfate formation becomes an issue. Regeneration opportunities for the particulate filter using $NO_2$ are reduced as a result.

In one example, the issues described above may be addressed by a method for generating $NO_2$ in a catalyst comprising a washcoat with zirconium, one or more base metal oxides, and a precious metal such as palladium that does not oxidize sulfur, with an exhaust gas flow being between lower and upper threshold flow rates, and facilitating a regeneration of a particulate filter located downstream of the catalyst via $NO_2$ when an exhaust gas temperature is greater than a threshold temperature. In this way, a $NO_2$ production rate is calculated based on values stored in a look-up table corresponding to the exhaust gas flow rate and an exhaust gas temperature to determine if a particulate filter regeneration may be facilitated by $NO_2$.

As one example, the particulate filter may be actively or passively regenerated. If the particulate filter is above a threshold oxygen facilitated regeneration temperature, then the filter is sufficiently hot to regenerate (e.g., burn off stored particulates) in the presence of oxygen. However, the threshold oxygen facilitated regeneration temperature is relatively high (e.g., 450-700° C.) compared to a threshold $NO_2$ facilitated regeneration temperature (e.g., 300-450° C.). The threshold $NO_2$ facilitated regeneration temperature corresponds to a regeneration in the presence of an amount of $NO_2$ greater than a threshold $NO_2$ particulate filter regeneration amount. The aftertreatment device production of $NO_2$ is based on at least an exhaust gas flow rate. If the sensed exhaust gas flow rate is greater than a lower threshold flow rate, then $NO_2$ produced from the aftertreatment device may promote regeneration at the particulate filter. In this way, lower exhaust gas temperatures, which may correspond to low- to mid-load driving, may be utilized to regenerate the particulate filter in conjunction with $NO_2$ production from the aftertreatment device configured to maintain its reactivity and durability in a diesel exhaust gas environment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a diesel oxidation catalyst (DOC) comprising one or more platinum group metal (PGM) oxides mixed with one or more base metal oxide (BMO) catalysts. In one example, the PGM is Pd, which may allow the DOC to exclude Pt, which may be susceptible to degradation due to its reactivity with sulfur dioxide, whereas the Pd is unreactive with sulfur dioxide. A composition of the mixture may be adjusted based on one or more of a downstream emission control device composition (e.g., a particulate filter) and an exhaust system environment of an engine, such as the engine shown in FIG. 1. Particulate filters may be passively or actively regenerated. A passive regeneration occurs when exhaust gas temperatures are sufficiently high without adjusting engine operating parameters outside of a driver demand. An active regeneration occurs when engine operating parameters are adjusted to increase exhaust gas temperatures to a sufficiently high temperature. As such, the active regeneration may reduce a vehicle fuel economy to increase the exhaust gas temperature. The DOC comprising the mixture of PGM and BMO catalysts is configured to produce $NO_2$ to promote particulate filter regeneration and/or $NO_x$ treatment in a selective catalytic reduction (SCR) device. The DOC may produce a varying amount of $NO_2$ based on at least exhaust gas temperatures, as shown by a graph illustrated on FIG. 2. As described above, $NO_2$ may promote particulate filter regeneration. In the example of FIG. 3, $NO_2$ reduces particulate filter regeneration temperatures compared to oxygen particulate filter regeneration temperatures. Said another way, particulate filter regenerations facilitated by oxygen occur at higher temperatures than particulate filter regenerations facilitated by $NO_2$.

Figure 4:
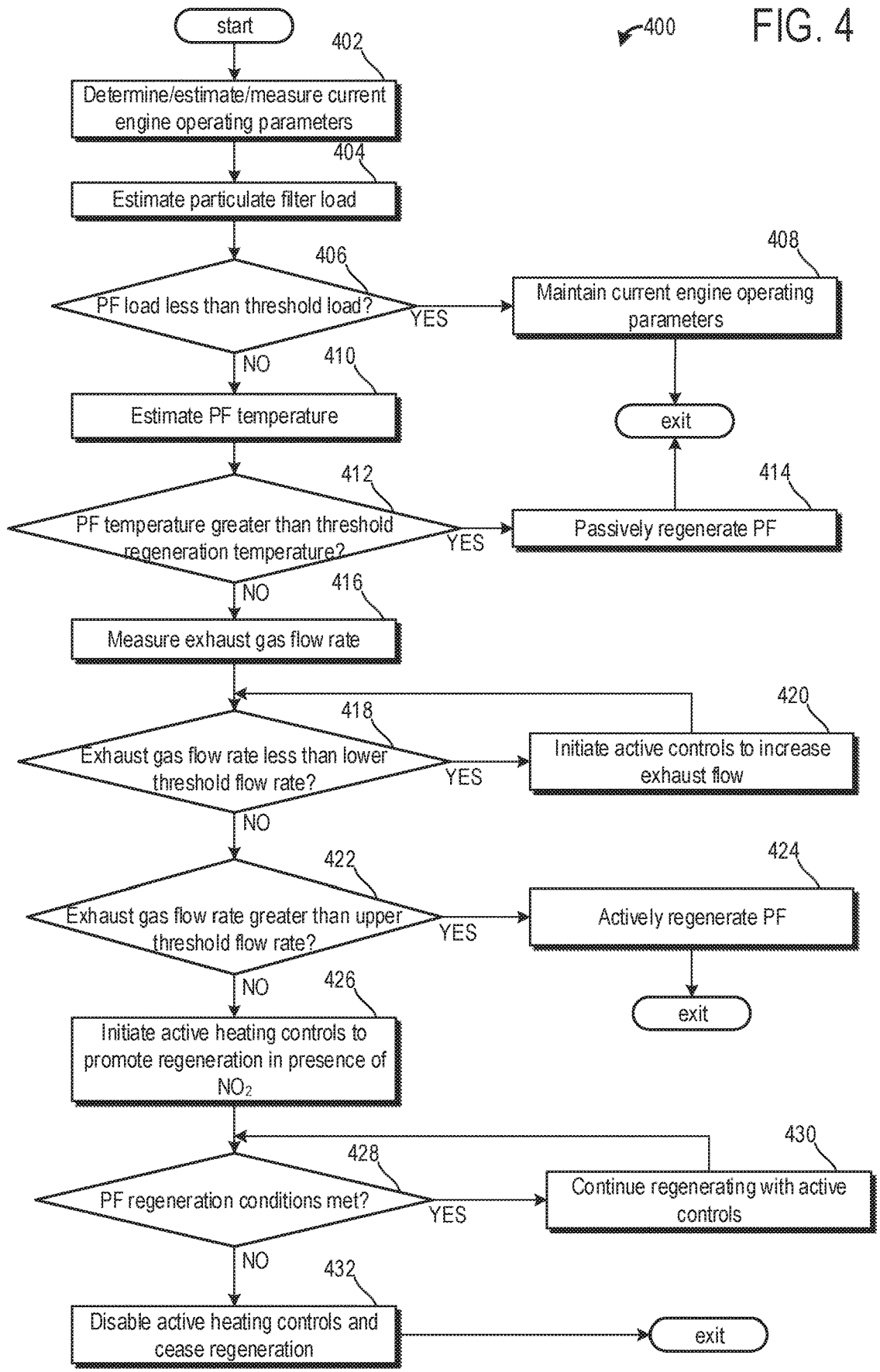
FIG. 4 shows a method for regenerating a particulate filter.

A method for managing regeneration activation and conditions of a particulate filter is shown in FIG. 4. The method accounts for exhaust gas flow rate, exhaust gas temperature, $NO_2$ production from the DOC, and a particulate filter load.

Figure 5:
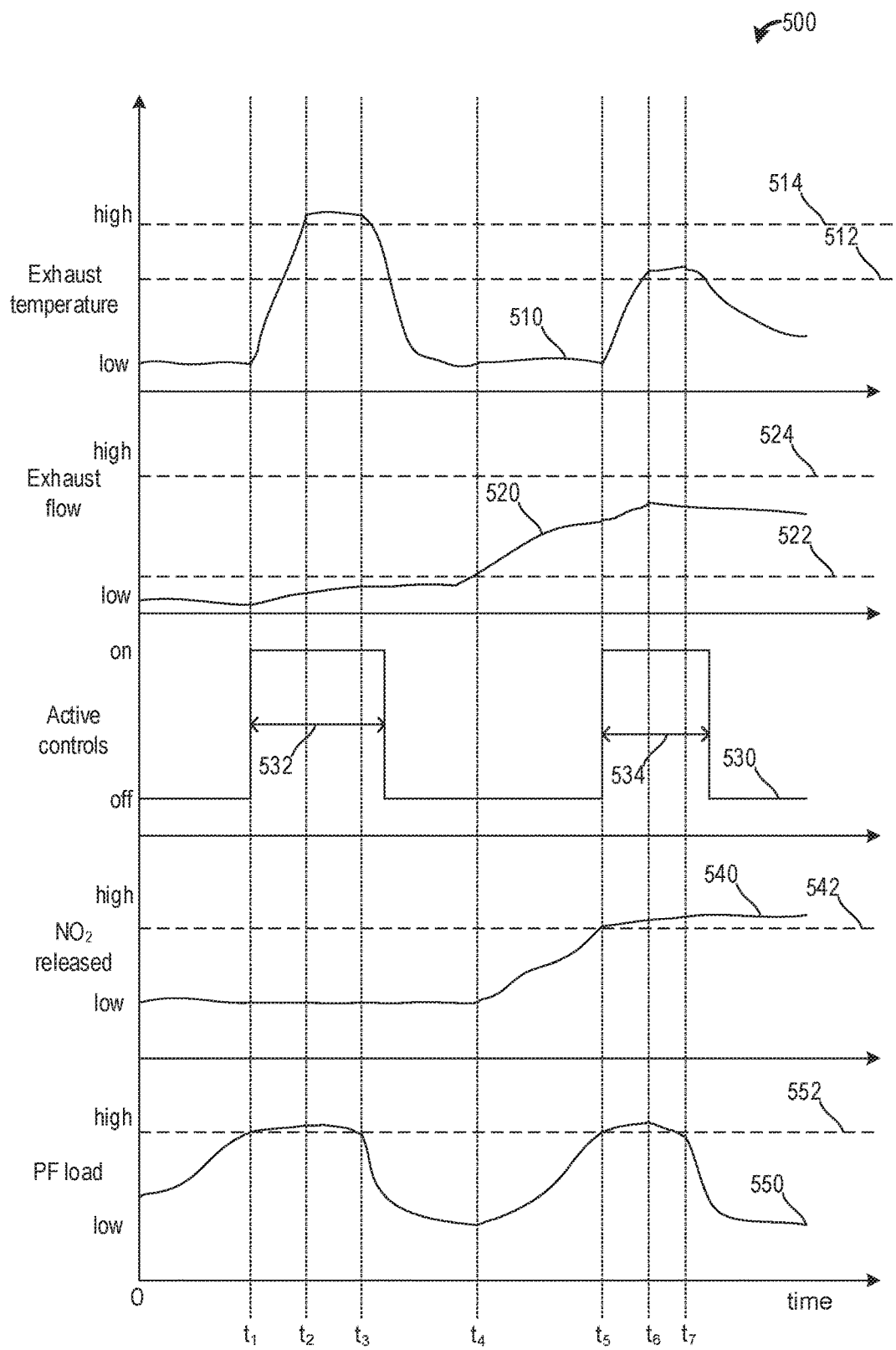
FIG. 5 shows a plot illustrating engine operating parameters based on the method of FIG. 4.
Figure 6:
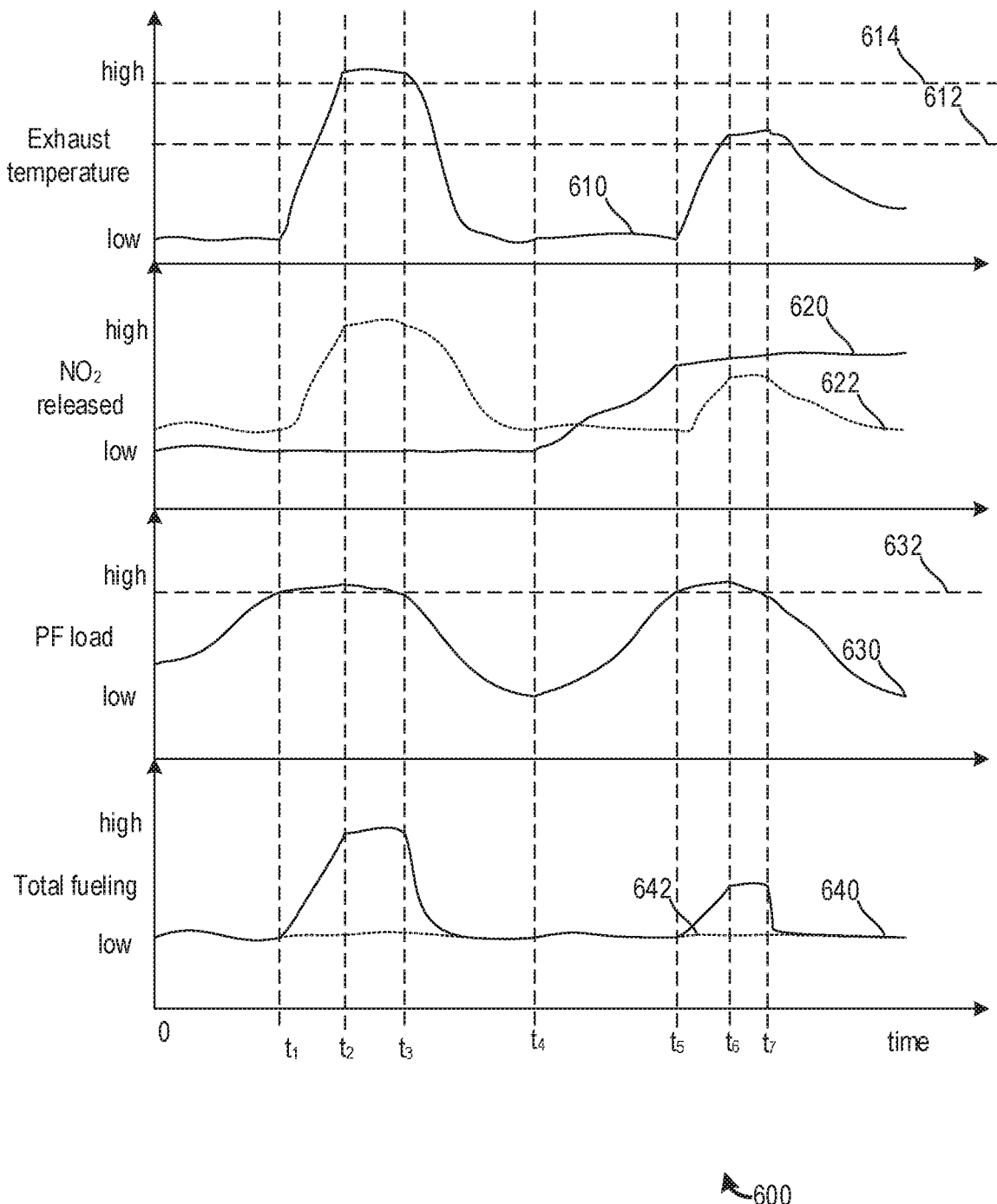
FIG. 6 shows a plot illustrating specific active controls for regenerating the particulate filter.

A plot illustrating an operational sequence of the engine carrying out the method is illustrated in FIG. 5. A plot illustrating an operational sequence of the engine performing active controls to regenerate the particulate filter is illustrated in FIG. 6.

Figure 1:
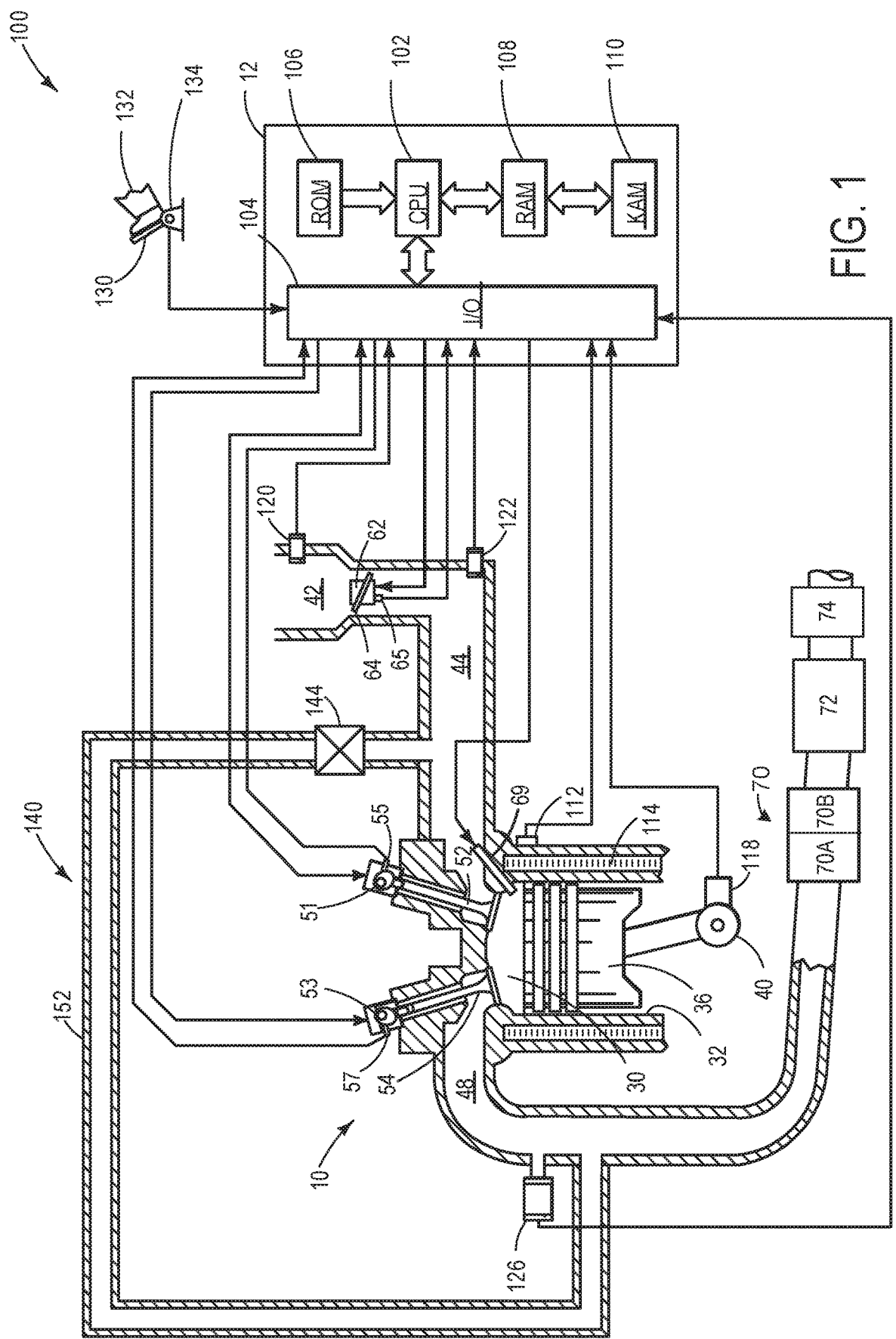
FIG. 1 shows a single cylinder of an engine.

Continuing to FIG. 1, a schematic diagram showing one cylinder of a multi-cylinder engine 10 in an engine system 100, which may be included in a propulsion system of a vehicle, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

The engine 10 may be a turbocharged engine comprising a compressor mechanically coupled to a turbine. Alternatively, the engine 10 may be supercharged, wherein a compressor is powered by an electric machine (e.g., a battery). A blade of the turbine may spin as exhaust gas flows through the turbine, which in turn may drive the compressor. An engine power output may increase by compressing (e.g., increasing a density of) intake air flowing through the compressor to the engine. In some examples, a charge air cooler may be located between the compressor and the engine. The charge air cooler may cool the compressed intake air, which further increases the density of the charge air, thereby increasing a power output of the engine.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an aftertreatment device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The aftertreatment device 70 is shown arranged along the exhaust passage 48 upstream of an emission control device 72. The aftertreatment device 70 is a diesel oxidation catalyst (DOC), in one example. Aftertreatment device 70 is physically coupled to the exhaust passage, such that exhaust gas from the engine flows through the device before flowing through a remainder of the exhaust passage 48 (e.g., before flowing into emission control device 72). Said another way, the catalyst is hermetically sealed along its outer circumference to an exhaust pipe of an exhaust passage. As such, catalyst receives exhaust gas through the exhaust passage before the emission control device 72.

The aftertreatment device 70 may include a substrate with flow-through passages located therein for exhaust gas to flow therethrough. In one example, the substrate is a honeycomb composed of cordierite. A washcoat with a support and one or more base metals may be coated onto the substrate. The support includes a zirconium oxides ($ZrO_2$), in one example. The base metals may include Co, Cu, Ce, Mn, Ni, Fe, Mn, Mo, and W. As an example, the washcoat includes a dosing level of 15 to 75 weight percent (wt %) of one or more of base metal oxides (BMO). For example, a washcoat may include Mn, Cu, and Ce at 20, 7.5, and 15 wt %, respectively. The base metal oxides are selected based on an exhaust gas environment of the vehicle. As such, a type and amount of BMO is adjusted in response to the exhaust gas environment of the vehicle. For example, Co and Cu are the most sulfur tolerant and the least inhibited by HCs of the listed base metal oxides. W, Mo, and Ce produce $NO_2$ at lower temperatures compared to the other listed base metal oxides, allowing passive regeneration via $NO_2$ for the particulate filter at a lower temperature (e.g., 200° C.). Mn demonstrates the greatest NO oxidation potential to produce $NO_2$. The exhaust gas environment may be dependent on at least an ambient environment and driver behavior. For example, if a driver typically drives in a cold environment (e.g., Detroit, Mich.), then a dealership may sell the driver a vehicle comprising the aftertreatment device 70 having a greater amount of W, Mo, or Ce compared to a vehicle located in a warm environment (e.g., Los Angeles, Calif.). Alternatively, if the driver is moving from a warm climate to a cold climate, an original aftertreatment device may be replaced by a new aftertreatment device comprising a different composition of base metal oxides configured for a colder exhaust gas temperatures due to the colder climate. In one example, the exhaust gas environment may be a lean exhaust gas environment and the base metal oxides used may include one or more of $Mn_2O_3$, CuO, and $CeO_2$. Alternatively, mixtures of BMO designs can be used to balance operation across a broad range of ambient conditions that may influence the nominal operating conditions for the vehicle.

The washcoat may further comprise a Pd washcoat additionally applied thereon. Thus, the substrate includes multiple catalytic materials including one or more base metal oxides and Pd. In one example, a Pd portion of the catalyst is located upstream of a BMO portion in a front axial zone, such as upstream portion 70A. Alternatively, the Pd portion may be located on a top portion of the device 70. Said another way, the upstream portion 70A may comprise a greater amount of Pd catalyst (e.g., PdO) compared to a downstream portion 70B. By doing this, hydrocarbons are oxidized before reaching the downstream portion 70B where oxidation of NO on the BMO may occur. A wt % of the Pd catalyst may be in the range of 0.5 to 3. In one example, the wt % of Pd in the washcoat is exactly 2. Furthermore, the wt % of the BMOs in the washcoat is exactly 50.

The emission control device 72 is shown arranged along the exhaust passage 48 downstream of the exhaust gas sensor 126 and aftertreatment device 70. The device 72 may be a three way catalyst (TWC), $NO_x$ trap, diesel oxidation catalyst (DOC), selective catalytic reduction (SCR) device, particulate filter (PF), various other emission control devices, or combinations thereof. In some examples, during operation of the engine 10, the emission control device 72 may be periodically reset by operating at least one cylinder of the engine within a particular air-fuel ratio. Herein, the emission control device 72 is a particulate filter.

$NO_2$ may promote particulate filter regeneration and/or selective catalytic reduction of nitrogen oxide ($NO_x$) emissions. In one example, particulate filter regeneration may occur at low exhaust temperatures during low- to mid-load driving conditions in the presence of high $NO_2$. For example, exhaust gas temperatures of 300 to 400° C. may be sufficient to initiate particulate filter regeneration in the presence of an amount of $NO_2$ greater than a threshold $NO_2$ facilitated regeneration amount. If a regeneration occurs when the amount of $NO_2$ is less than the threshold $NO_2$ facilitated amount, then the regeneration is facilitated by oxygen and exhaust gas temperatures may be above 600° C. to initiate the oxygen facilitated regeneration.

A selective catalytic reduction (SCR) device 74 is shown located downstream of the particulate filter 72. As such, exhaust gas flows through the particulate filter 72 before flowing through the SCR device 74. The SCR device 74 may reduce $NO_2$ and other compounds via a reductant coating surfaces of the SCR device 74. In this way, an injector (not shown) may be located between the particulate filter 72 and the SCR device 74 and configured to admit reductant into the exhaust passage upstream of the SCR device 74. It will be appreciated by those skilled in the art that other combinations of the DOC 70, particulate filter 72 and SCR 74 may be realized without departing from the scope of the present disclosure. For example, one combination may include a first DOC, upstream of an SCR device, the SCR device being upstream of a second DOC, and the second DOC being upstream of a particulate filter. The first DOC and the second DOC may be substantially identical. Alternatively, the first and second DOCs may comprise different combinations and/or amounts of BMOs. Furthermore, a positioning of the SCR and particulate filter may be reversed such that the particulate filter is upstream of the SCR.

An exhaust gas recirculation (EGR) system 140 may route a desired portion of exhaust gas from the exhaust passage 48 to the intake manifold 44 via an EGR passage 152 which branches from the exhaust passage 48 from a location between the exhaust gas sensor 126 and the aftertreatment device 70. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. In one example, the exhaust gas sensor 126 may sense one or more of an exhaust back pressure and exhaust gas temperature. The controller 12 may determine a load of the particulate filter 72 based on the sensed exhaust back pressure and determine if a regeneration is needed. If the exhaust gas temperature is not sufficiently high enough for a regeneration to passively occur, then the controller 12 may initiate active heating controls to increase the exhaust gas temperature. For example, increasing the exhaust gas temperature may include adjusting an actuator of the fuel injector 69 to adjust a fuel injection amount following combustion to increase the exhaust gas temperature. Additionally or alternatively, the EGR valve 144 may be moved to a more closed position to decrease the amount of EGR flowing to the cylinder 30, thereby increasing exhaust gas temperatures. In some examples, additionally or alternatively, a fuel injector, such as fuel injector 69 or a different fuel injector located downstream of the cylinder 30 in the exhaust passage 48, may inject fuel to provide exothermic heat over the aftertreatment device 70 to actively heat the PF 72.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these figures graphically represent code to be programmed into the computer readable storage medium in controller 12 to be carried out by the controller in combination with the engine hardware, as illustrated in FIG. 1.

Thus, a system may comprise a catalyst located in an exhaust passage of an engine driven vehicle, where the catalyst comprises a washcoat having a zirconium oxide support, one or more base metal oxides and at least a precious metal, a particulate filter located in a position of the exhaust passage downstream of the catalyst relative to a direction of exhaust gas flow, and a controller with computer readable instructions stored thereon that enable the controller to actively regenerate the particulate filter via active controls configured to increase an exhaust gas temperature to a temperature greater than a threshold temperature and adjust an exhaust gas flow rate to a rate between upper and lower threshold exhaust gas flow rates. The threshold temperature is a threshold $NO_2$ facilitated regeneration temperature, in one example, and the threshold $NO_2$ facilitated regeneration temperature is lower than a threshold oxygen facilitated regeneration temperature. The threshold $NO_2$ facilitated regeneration temperature is based on a regeneration temperature of the particulate filter in the presence of $NO_2$ being greater than a threshold amount of $NO_2$, and where the threshold oxygen facilitated regeneration temperature is based on a regeneration temperature of the particulate filter in the presence of an amount of $NO_2$ being less than the threshold amount of $NO_2$. The catalyst is physically coupled to the exhaust passage, and where exhaust gas from the engine flows through the catalyst before flowing into the particulate filter. A selective catalytic reduction device is located downstream of the particulate filter.

Figure 2:
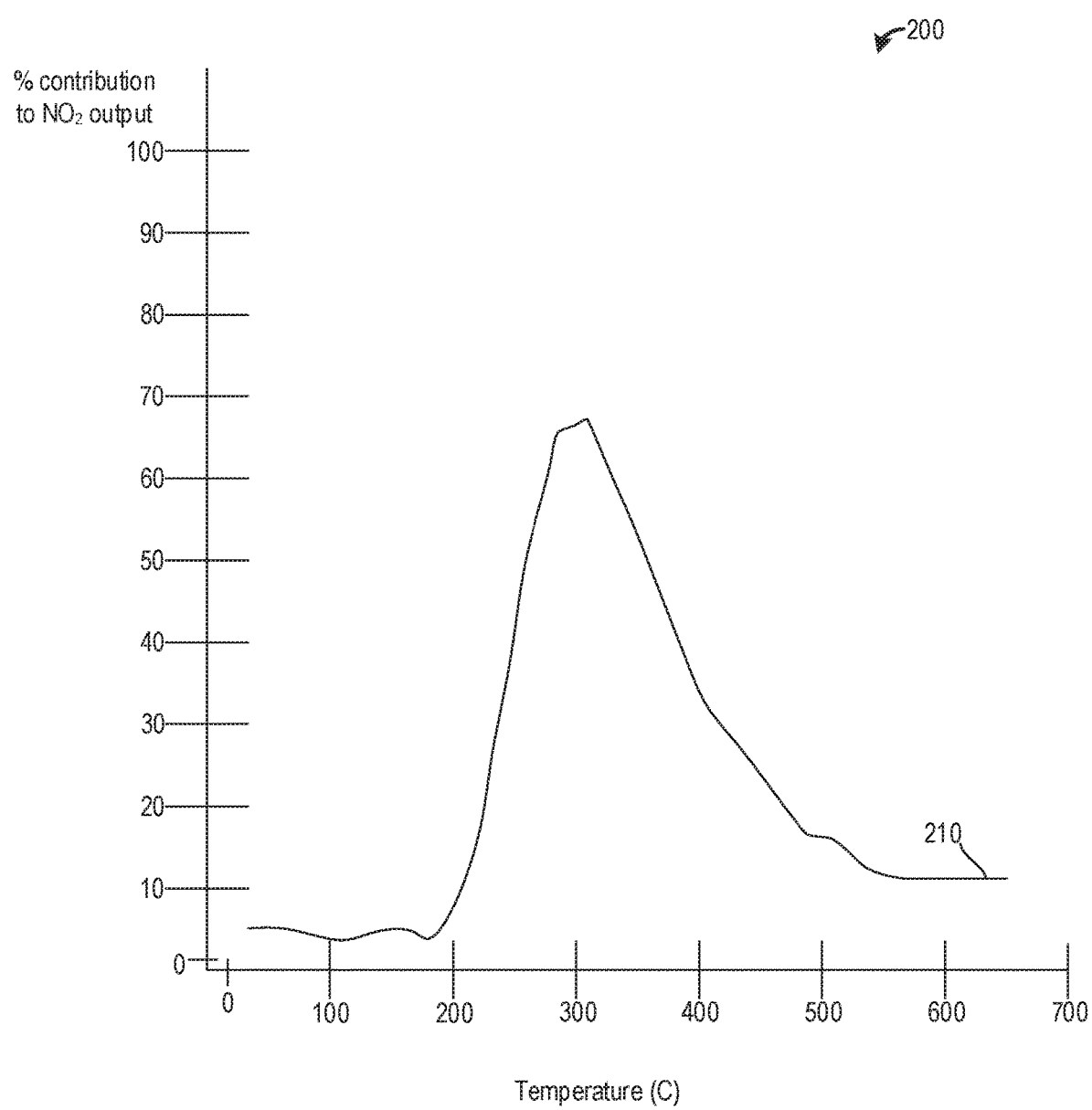
FIG. 2 shows a graph illustrating $NO_2$ production by the aftertreatment device.
Figure 3:
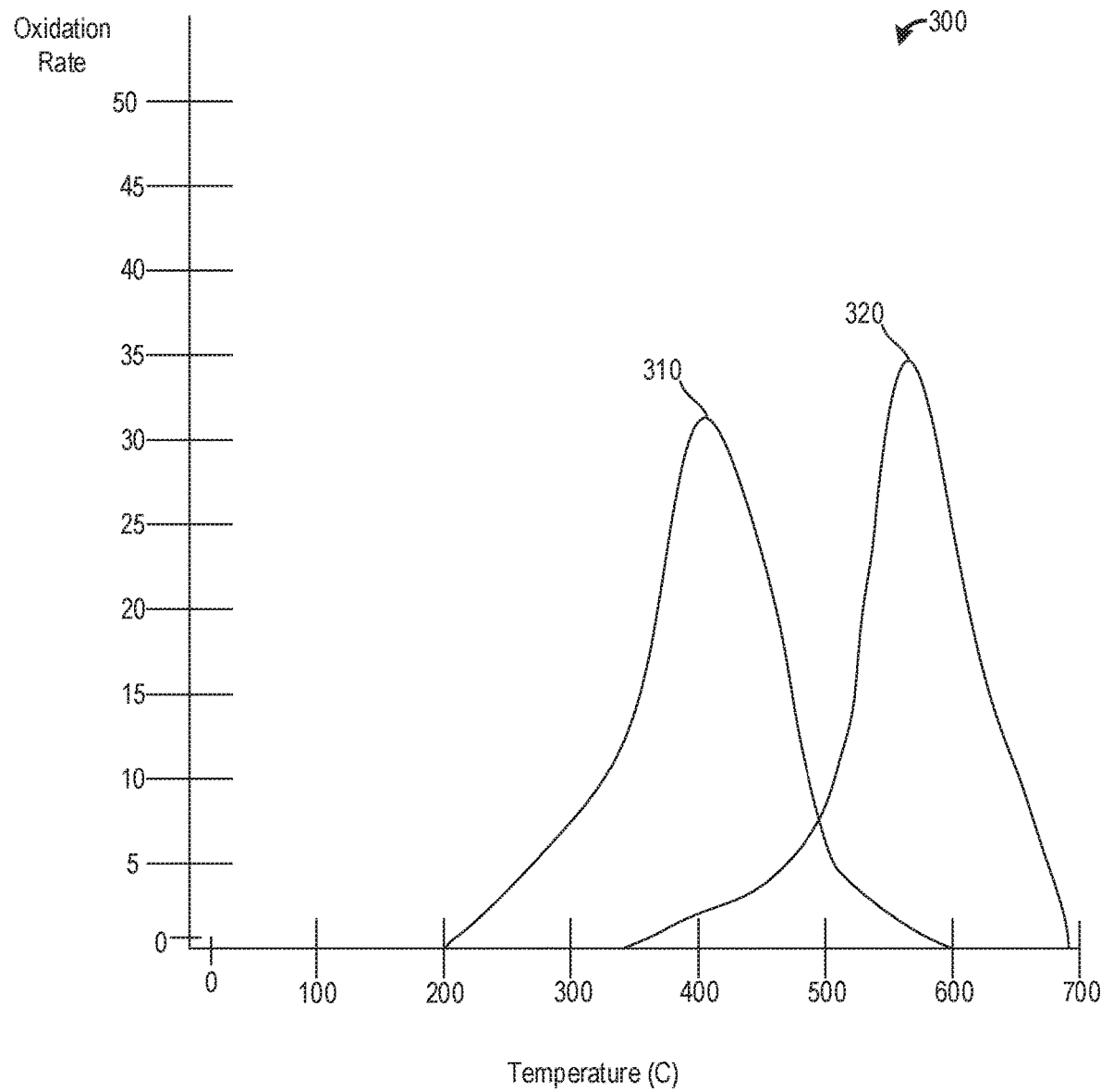
FIG. 3 shows a comparison between a soot oxidation rate at a particulate filter in the presence of $NO_2$ and oxygen.

Turning now to FIG. 2, it shows a graph 200 illustrating a $NO_2$ output of an aftertreatment device (e.g., aftertreatment device 70 of FIG. 1) against temperature. As described above, the aftertreatment device 70 is a DOC with a substrate coated with Pd and one or more base metal oxides. Thus, the graph 200 illustrates $NO_2$ output from a specific DOC. In one example, the DOC comprises a washcoat having a zirconium oxide (e.g., $ZrO_2$), a palladium oxide (e.g., PdO), and a group of base metal oxides including manganese oxides (e.g., $Mn_2O_3$), cerium oxides (e.g., $CeO_2$), and copper oxides (e.g., CuO). The wt % of each of the base metal oxides included in the washcoat is in the range of 1 to 30 and a wt % of PdO in the washcoat is in the range of 0.5 to 3.

In one example, the DOC 70 comprises a honeycomb substrate comprised of cordierite treated with a washcoat. $ZrO_2$, PdO, CuO, $CeO_2$, and $Mn_2O_3$ are further included in the washcoat. In one example, base metal oxides and the PdO are applied in different washcoats. For example, the washcoat comprising base metal oxides is applied first and the washcoat comprising PdO is applied second, or vice-versa. This may layer the catalysts and provide the DOC with increased reactivity based on exhaust system conditions. In this way, the DOC is substantially unreactive to sulfur dioxide ($SO_2$). For example, the PdO may oxidize CO and hydrocarbons and the base metal oxides may oxidize NO, but neither of the catalysts may oxidize $SO_2$, thereby prolonging a longevity of the DOC.

Temperature increases from a left to a right side of the figure. In one example, the temperature corresponds to an exhaust gas temperature. Alternatively, the temperature corresponds to an aftertreatment device temperature. Additionally, aftertreatment device $NO_2$ output is depicted as a percentage of total $NO_2$ output of the vehicle, where the total $NO_2$ output is based on a total of engine $NO_2$ output and the aftertreatment device $NO_2$ output. For example, if the aftertreatment device $NO_2$ output is substantially equal to 60%, then the engine output $NO_2$ is substantially equal to 40%. In this way, a decrease in aftertreatment device $NO_2$ output does not correspond to less overall $NO_2$ production in the aftertreatment device. That is to say, total $NO_2$ output is a ratio, and as the temperature increases an engine combustion temperature may also increase, thereby resulting in increased engine $NO_2$ output and increased aftertreatment device $NO_2$ output. However, the engine $NO_2$ output may increase at a faster rate than the aftertreament device $NO_2$ output as temperatures increases.

Although not shown on the graph 200, aftertreatment device $NO_2$ production is further dependent on an exhaust gas flow rate. Specifically, the aftertreatment device produces higher amounts of $NO_2$ when the exhaust gas flow rate is within a range between lower and upper threshold flow rates. As such, exhaust gas flow rates less than the lower threshold flow rate are too slow and may correspond to too low an exhaust gas temperature (e.g., 150° C.). Alternatively, low exhaust gas flow rates and low exhaust gas temperatures may correspond to low engine $NO_x$ output, which limits $NO_2$ production at the aftertreatment device. Additionally, exhaust gas flow rates above the upper threshold flow rate are too fast and may correspond to too high an exhaust gas temperature (e.g., 600° C.). At these extreme ends of the exhaust gas temperature spectrum shown, aftertreatment device $NO_2$ output is reduced. High exhaust gas temperatures above a thermodynamic limit (e.g., above 600° C.) and high exhaust gas flow rates reduce an efficiency of the aftertreament device to produce $NO_2$.

Aftertreatment device $NO_2$ output 210 begins to increase before 200° C. from a relatively low $NO_2$ output. For example, prior to 180° C., the aftertreatment device $NO_2$ output is less than 10% of total output. This may correspond to an amount of $NO_2$ too low to initiate regeneration of a particulate filter (e.g., particulate filter 72 of FIG. 1). As exhaust gas temperatures increase beyond 200° C., the aftertreatment device $NO_2$ output 210 produces a larger portion of total $NO_2$ output. Between similar to 260° C. to 360° C., the aftertreatment device $NO_2$ output 210 is substantially equal to or greater than 50%. That is to say, the aftertreatment device produces at least half of the total $NO_2$ output from 260-360° C. As the temperature increases from 360° C., the aftertreatment device $NO_2$ output is less than 50%, meaning that the aftertreatment device begins to produce less than half of the total $NO_2$ output. However, as described above, an actual amount of $NO_2$ output from the aftertreatment device may still continue to increase. In one example, the actual amount of $NO_2$ produced by the aftertreatment device is highest at 400° C. $NO_2$ output from the aftertreatment device may correspond to a soot oxidation rate and/or regeneration rate of the particulate filter, as will be described below.

Turning now to FIG. 3, a graph 300 depicts a soot oxidation rate based on regenerations facilitated via $NO_2$ or oxygen. In one example, a regeneration initiated via $NO_2$ includes an exhaust gas $NO_2$ amount being greater than a threshold $NO_2$ facilitated regeneration amount. For example, the threshold amount corresponds a ratio of $NO_2$ output to carbon. Hydrocarbons are oxidized initially to CO, and then to $CO_2$ by $NO_2$. As such, at least two moles (e.g., equivalences) of $NO_2$ are consumed for each mole of hydrocarbon (e.g., HC). This may be seen in equations 1 and 2:

$$NO_2+C \rightarrow NO+CO \qquad (1)$$

$$NO_2+CO \rightarrow NO+CO_2 \qquad (2)$$

Thus, the regeneration facilitated via oxygen includes the exhaust gas $NO_2$ amount being less than the threshold $NO_2$ facilitated regeneration amount. As will be described below with respect to graph 300, $NO_2$ may promote oxidation of soot on the particulate filter such that temperatures needed to oxidize soot stored on the particulate filter are significantly reduced in the presence of an amount of $NO_2$ greater than the threshold $NO_2$ facilitated regeneration amount.

The graph 300 includes $NO_2$ oxidation rate plot 310 and oxygen oxidation rate plot 320. The $NO_2$ oxidation rate plot 310 depicts a rate of soot oxidation on the particulate filter based on a regeneration initiated by an amount of $NO_2$ greater than the threshold $NO_2$ facilitated regeneration amount. The oxygen oxidation rate plot 320 depicts a rate of soot oxidation on the particulate filter based on a regeneration initiated by oxygen.

As shown, a regeneration exposed to a greater amount of $NO_2$ (e.g., an amount of $NO_2$ greater than the threshold $NO_2$ facilitated regeneration amount) may begin at lower temperatures than a regenerations exposed to a lesser amount of $NO_2$ (e.g., an amount of $NO_2$ less than the threshold $NO_2$ facilitated regeneration amount). Specifically, the $NO_2$ oxidation rate increases above zero at 200° C. and the oxygen oxidation rate increases above zero at 340° C. The $NO_2$ oxidation rate reaches a highest value of 32 at similar to 400° C. The oxygen oxidation rate reaches a highest value of 35 at similar to 570° C. Thus, $NO_2$ facilitated regenerations have a soot oxidation rate similar to oxygen facilitated regenerations, despite performing the oxidation at lower exhaust gas temperatures.

Thus, the graph 300 illustrates particulate filter regenerations facilitated by $NO_2$ and oxygen. Due to the lower temperatures of the $NO_2$ facilitated regeneration, active regenerations of the particulate filter may consume less fuel than the oxygen facilitated particulate filter regeneration. As a result, adjustments made to increase exhaust gas temperatures for the active regeneration are less extensive and consume less fuel when facilitated by $NO_2$ instead of oxygen, as will be described below.

The catalyst described above may herein be used with a method stored on a controller with computer readable instructions that when executed enable the controller to perform the method. The method comprising generating $NO_2$ in a catalyst comprising a washcoat with zirconium, one or more base metal oxides, and a precious metal, with an exhaust gas flow being between lower and upper threshold flow rates and facilitating a regeneration of a particulate filter located downstream of the catalyst via $NO_2$ when an exhaust gas temperature is greater than a threshold temperature. Generating $NO_2$ includes flow exhaust gas through the catalyst and where the exhaust gas flows at an exhaust gas flow rate between upper and lower exhaust gas thresholds and where the exhaust gas temperature is greater than 200° C. The threshold temperature is a threshold $NO_2$ facilitated regeneration temperature, and where the threshold $NO_2$ facilitated regeneration temperature is based on the particulate filter being exposed to an amount of $NO_2$ capable of facilitating a regeneration of the particulate filter. The regeneration is facilitated by $NO_2$ when an amount of $NO_2$ produced by an engine and the catalyst is greater than a threshold $NO_2$ regeneration amount.

The particulate filter may be determined to demand a regeneration when a particulate filter load is greater than a threshold load. However, if an exhaust gas temperature is less than the threshold temperature, then regenerating includes initiating active controls to adjust engine operating parameters to increase the exhaust gas temperature. The active controls include one or more of decreasing an EGR flow rate, increasing a fuel injection pressure, increasing a fuel injection volume, decreasing an air/fuel ratio, increasing manifold pressure, and retarding a fuel injection.

Turning now to FIG. 4 it shows a method 400 for regenerating the particulate filter 72 of FIG. 1. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method 400 includes determining, estimating, and/or measuring current engine operating parameters. Current engine operating parameters may include engine temperature, engine speed, manifold pressure, ambient humidity, throttle position, engine load, EGR flow rate, exhaust gas temperature, and air/fuel ratio.

At 404, the method 400 includes estimating a particulate filter load. In one example, the particulate filter load is estimated based on one or more of an exhaust backpressure, which may be sensed by exhaust gas sensor 126 of FIG. 1. Alternatively, a difference in exhaust gas pressure directly upstream and downstream of the particulate filter may correspond to the particulate filter load. As the backpressure and/or the difference increase, the estimated particulate filter load increases. As such, as the filter becomes increasingly loaded with soot, exhaust flow through the filter is impeded, thereby increasing the exhaust backpressure. In another example, the particulate filter load may be estimated based on an estimated amount of particulates released from the engine since a previous regeneration. Thus, the previous regeneration sets a baseline load and the estimated amount of particulates is added to the baseline load to provide the particulate filter load. The estimated amount of particulates is based on values stored in a look-up table with multiple inputs corresponding to engine particulate output. The inputs may include engine load, engine temperature, throttle position, vehicle speed, ambient humidity, and air/fuel ratio. For example, the estimated engine particulate output increases as engine load increases, throttle position increases, vehicle speed increases, ambient humidity increases, and air/fuel ratio decreases. Alternatively, the particulate filter load may be estimated based on a number of miles driven since a previous regeneration, where the number of miles may directly correspond to particulate load.

It will be appreciated that a previous regeneration may be a complete or partial regeneration. The complete regeneration resets the particulate filter to a load where substantially zero particulates are stored on the filter. The partial regeneration reduces the particulate filter load to a load greater than zero but less than the load prior to regeneration. A regeneration may be partial if the regeneration is ceased prior to finishing due to regeneration conditions no longer being met. At any rate, a regeneration restores a particulate filter load to a lesser load.

At 406, the method 400 includes determining if the PF load is less than a threshold load. In one example, if a pressure (e.g., backpressure) measured directly upstream of the particulate filter (e.g., exhaust backpressure) is greater than a threshold pressure, then the PF load is determined to be greater than the threshold load. Said another way, when the PF load is greater than the threshold particulate filter load, exhaust gas flow through the filter is inhibited and exhaust backpressure increases to a pressure greater than the threshold pressure. If the PF load is less than the threshold load, then the method 400 proceeds to 408 to maintain current engine operating parameters and does not regenerate the particulate filter. In this way, exhaust gas flows through the filter at a sufficient rate and does not increase exhaust backpressure to a pressure capable of inhibiting engine performance.

In some examples, the method 400 may regenerate the particulate filter in response to the PF load being less than the threshold load if exhaust gas temperatures are sufficiently hot to passively regenerate the particulate filter, as described below. Additionally or alternatively, the method may actively regenerate the particulate filter, as described below, where a duration of the active regeneration is based on the estimated particulate filter load. Thus, as the estimated particulate filter load increases, the duration of the active regeneration increases. In this way, determination that the PF load is less than the threshold load may not prevent the particulate filter from regenerating and the method may continue, in some examples.

If the PF load is not less than the threshold load, then the method proceeds to 410 to estimate a PF temperature. In one example, the exhaust gas temperature determined at 402 may be used to estimate the PF temperature. Alternatively, a temperature sensor may be integrated into the particulate filter, which may directly sense a temperature of the particulate filter.

At 412, the method 400 includes determining if the PF temperature is greater than a threshold oxygen facilitated regeneration temperature. The threshold oxygen facilitated regeneration temperature is based on a temperature of the particulate filter capable of burning particulates stored thereon in the presence of oxygen and an amount of $NO_2$ less than a threshold $NO_2$ facilitated regeneration amount, as described above. In one example, the threshold regeneration temperature is 550° C. Thus, if the PF temperature is greater than the threshold oxygen facilitated regeneration temperature, then the method 400 proceeds to 414 to passively regenerate the particulate filter and does not adjust engine operating parameters. As such, current engine operating parameters, which meet a driver demand, are sufficient to meet passive regeneration conditions and the particulates on the particulate filter may combust in the presence of hot exhaust gas and oxygen.

If the PF temperature is not greater than the threshold regeneration temperature, then the method 400 proceeds to 416 to measure an exhaust gas flow rate. In one example, exhaust sensor 126 of FIG. 1 is configured to measure an exhaust gas flow rate. Thus, an exhaust gas flow rate flowing to the aftertreatment device 70 and the particulate filter 72 is substantially equal to a difference between the exhaust gas flow rate and an EGR flow rate. Alternatively, an exhaust gas flow rate sensor may be located downstream of the intersection between the exhaust passage 48 and the EGR passage 152. Thus, the exhaust gas flow rate sensor directly senses an exhaust gas flow rate flowing to the aftertreatment device 70 and the particulate filter 72.

In another example, the exhaust gas flow rate may be calculated based on one or more engine operating conditions. For example, an exhaust gas volume flow is calculated via a volumetric efficiency, manifold air aspirated, EGR rate estimation, fueling conditions, exhaust gas composition, and temperature. The exhaust gas volume flow is divided by a cross-section of the exhaust passage to determine exhaust gas flow rate. The exhaust gas flow rate increase as temperature increases. Additionally, the exhaust gas flow rate increases as the exhaust gas composition includes a greater amount of higher molar mass compounds.

At 418, the method 400 includes determining if the exhaust gas flow rate is less than a lower threshold flow rate. The lower threshold flow rate corresponds to one or more engine operating parameters (e.g., engine load) which may produce a sufficient amount of NO, which may be oxidized at the aftertreatment device to produce a sufficient amount of $NO_2$ for particulate filter regeneration. This may herein be referred to as a threshold $NO_2$ facilitated regeneration. As described above with respect to equations 1 and 2, the sufficient amount of $NO_2$ for particulate filter regeneration is substantially equal two stoichiometric equivalences of $NO_2$ for each stoichiometric equivalent of C. If the exhaust gas flow rate is less than the lower threshold flow rate, then the method 400 proceeds to 420 to initiate active controls to increase exhaust gas flow. This may include boosting engine rotations per minute (RPM), decrease EGR flow rate, increase air intake, increase fueling, decrease in-cylinder cooling, etc. In-cylinder cooling may include at least in-cylinder water injections. Increased fueling may include increasing a primary and/or post-injection, wherein the primary injection occurs prior to combustion and the post-injection occurs following combustion and prior to exhaust. The method 400 continues to monitor the exhaust gas flow rate until the flow rate is no longer less than the lower threshold flow rate.

If the exhaust gas flow rate is not less than the lower threshold flow rate, then the method 400 proceeds to 422 to determine if the exhaust gas flow rate is greater than an upper threshold flow rate. In one example, the upper threshold flow rate is substantially equal to a highest flow rate of exhaust gas where the exhaust gas is provided a sufficient amount of time in the aftertreatment device to produce a desired amount of $NO_2$ for particulate filter regeneration. As such, if the exhaust gas flow rate is greater than the upper threshold flow rate, then the exhaust gas is too fast and the method 400 proceeds to 424 to actively regenerate the particulate filter. Actively regenerating the particulate filter includes intrusively adjusting engine operating parameters to increase an exhaust gas temperature to heat the particulate filter to a temperature higher than the threshold regeneration temperature. In one example, adjustments may include increasing a fuel injection either via a delayed fuel injection or increased fuel injection volume. As such, exhaust gas temperatures are sufficiently increased and oxygen may facilitate regeneration of the particulate filter.

If the exhaust gas flow rate is less than the upper threshold flow rate, then the exhaust gas flow rate is between the lower and upper threshold flow rates and the method 400 proceeds to 426 to initiate active heating controls to promote regeneration in the presence of $NO_2$. The active heating controls may be substantially similar to the adjustments made during the active regeneration described at 424. However, the active heating controls may be more efficient than the adjustments corresponding to active regeneration when the regeneration is facilitated by oxygen. For example, a temperature range for regenerating the particulate filter in the presence of high levels of $NO_2$ (e.g., an amount of $NO_2$ greater than a threshold $NO_2$ facilitated regeneration amount) is substantially equal to 300-450° C. This temperature range may also be referred to as a threshold $NO_2$ facilitated regeneration temperature. While operating in this temperature range, the aftertreatment device may produce 25-65% of a vehicle total $NO_2$ output. A temperature range for regenerating the particulate filter via $O_2$ is substantially equal to 500-600° C. As such, adjustments during the active regeneration in the presence of low $NO_2$ (e.g., an amount of $NO_2$ less than the threshold $NO_2$ facilitated regeneration amount) consume a greater amount of fuel than adjustments during active regeneration in the presence of high $NO_2$.

At 428, the method 400 includes determining if particulate filter regeneration conditions are still met. For example, if the exhaust gas flow rate falls below the lower threshold flow rate or rises above the upper threshold flow rate, then the regeneration conditions for regeneration via $NO_2$ are no longer met. Additionally, if the particulate filter is completely regenerated (e.g., substantially all soot stored on the filter is burned off), then the regeneration conditions are no longer met. Additionally or alternatively, conditions are no longer met if an engine component reaches a threshold temperature and demands cooler engine operating temperatures. As such, one or more adjustments may be deactivated to mitigate degradation to the engine component. This may terminate the regeneration if exhaust temperatures fall to a temperature (e.g., less than 300° C.) too low to continue the regeneration.

If particulate filter regeneration conditions are still met, then the method 400 proceeds to 430 to continue regenerating with active controls. The regeneration continues to monitor regeneration conditions until they are no longer met. If the regeneration are no longer met, then the method 400 proceeds to 432 to disable active heating controls and ceases the regeneration. In this way, the regeneration may be a complete regeneration or a partial regeneration where conditions were no longer met during the regeneration, forcing termination of the regeneration.

Thus, a method for an engine driven vehicle comprising regenerating a particulate filter without adjusting engine operating parameters during a first mode, facilitating a particulate filter regeneration with oxygen by adjusting engine operating parameters to a first magnitude during a second mode, and facilitating the particulate filter with $NO_2$ by adjusting engine operating parameters to a second magnitude during a third mode, where the $NO_2$ is produced by at least a diesel oxidation catalyst located upstream of the particulate filter, where the diesel oxidation catalyst comprises a washcoat with a zirconium oxide support, with the washcoat further comprising at least manganese oxide and a palladium catalyst; where the first magnitude is greater than the second magnitude.

The regeneration is passively facilitated by oxygen when an exhaust gas temperature is greater than a threshold oxygen facilitated regeneration temperature, an amount of $NO_2$ at the filter is less than a threshold regeneration amount, and an exhaust gas flow rate is outside of a range between upper and lower threshold flow rates during the first mode. Alternatively, the regeneration is passively facilitated by $NO_2$ when an exhaust gas temperature is greater than a threshold $NO_2$ facilitated regeneration temperature, an amount of $NO_2$ at the filter is greater than a threshold $NO_2$ regeneration amount, and an exhaust gas flow rate is within a range between upper and lower threshold flow rate during the first mode.

The particulate filter regeneration during the second mode includes initiating active controls configured to adjust engine operating parameters by the first magnitude, wherein the first magnitude corresponds to increasing an exhaust gas temperature to a temperature greater than a threshold oxygen facilitated regeneration temperature, and where the threshold oxygen facilitated regeneration temperature is equal to 600° C., and where an amount of $NO_2$ at the particulate filter is less than a threshold $NO_2$ regeneration amount.

The particulate filter regeneration during the third mode includes initiating active controls configured to adjust engine operating parameters by the second magnitude, wherein the second magnitude corresponds to increasing an exhaust gas temperature to a temperature greater than a threshold $NO_2$ facilitated regeneration temperature, and where the threshold $NO_2$ facilitated regeneration temperature is equal to 450° C., and where an amount of $NO_2$ at the particulate filter is greater than a threshold $NO_2$ regeneration amount. The threshold $NO_2$ regeneration amount corresponds to an amount of $NO_2$ sufficient to promote burning of soot stored on the particulate filter.

The catalyst is hermetically sealed along its outer circumference to an exhaust pipe of an exhaust passage. As such, catalyst receives exhaust gas through the exhaust passage before the particulate filter.

Turning now to FIG. 5, it shows a plot 500 for controlling active regenerations of a particulate filter located downstream of a DOC with nitrogen oxide releasing capabilities (e.g., such as aftertreatment device 70 of FIG. 1). In one example, the operational sequence is based on operation of method 400 of FIG. 4 including components from engine system 100 of FIG. 1. However, the plot 500 does not include passive regeneration conditions for reasons of brevity. Plot 500 includes an exhaust gas temperature (line 510), a threshold $NO_2$ facilitated regeneration temperature (dashed line 512), and a threshold oxygen facilitated regeneration temperature (dashed line 514). The plot 500 further includes an exhaust gas flow rate (line 520), a lower threshold exhaust gas flow rate (dashed line 522), an upper threshold exhaust gas flow rate (dashed line 524), active controls (line 530), amount of $NO_2$ released (line 540), a threshold $NO_2$ regeneration amount (dashed line 542), a particulate filter load (line 550), a threshold particulate load (dashed line 552). In one example, the PF load represents a PF load on the PF 72 of FIG. 1. Likewise, the $NO_2$ released represents an amount of $NO_2$ released from the aftertreatment device 70. Time increases from a left to a right side of the figure.

Prior to $t_1$, the exhaust gas temperature is relatively low (shown by line 510) and less than the threshold $NO_2$ facilitated regeneration temperature (shown by dashed line 512). As shown and as described above, the threshold $NO_2$ facilitated regeneration temperature is less than the threshold oxygen facilitated regeneration temperature (shown by dashed line 514). The exhaust gas flow (shown by line 520) is less than the lower threshold flow rate (shown by dashed line 522), which is less than the upper threshold flow rate (shown by dashed line 524). Active controls are off (shown by line 530). In the example shown, the active controls are a binary function, depicted as being either on or off, however, as explained above and as will be described in greater detail below, the active controls may provide varying degrees of regeneration promoting adjustments. Since the exhaust gas flow is less than the lower threshold flow rate, the $NO_2$ released is relatively low and less than the threshold $NO_2$ regeneration amount. The PF load is increasing toward the threshold PF load (shown by line 550 and dashed line 552, respectively). In this way, a regeneration is not occurring prior to $t_1$ due to exhaust gas temperatures, and thereby particulate filter temperatures, being too low.

At $t_1$, the particulate filter load surpasses the threshold PF load, indicating a regeneration demand. In response, active controls are activated. Since the $NO_2$ released is less than the threshold $NO_2$ regeneration amount, the active controls adjust engine operating conditions to increase exhaust gas temperatures to the threshold oxygen facilitated regeneration temperature. As such, the exhaust gas temperature begins to increase. Additionally, the exhaust flow rate begins to increase due to increasing exhaust gas temperatures.

After $t_1$ and prior to $t_2$, the active controls remain active. In one example, the active controls include increasing a post-injection amount (e.g., a fuel injection following combustion and prior to exhaust) in one example. The exhaust gas temperature increases above the threshold $NO_2$ and oxygen facilitated regeneration temperatures. The exhaust gas flow remains below the lower threshold flow rate. The $NO_2$ released remains relatively low and below the threshold $NO_2$ regeneration amount.

At $t_2$, the active controls are active and the exhaust temperature is greater than the threshold oxygen facilitated regeneration temperature. As such, particulate filter regeneration is initiated and the particulate filter load begins to decrease toward the threshold PF load. The $NO_2$ released and the exhaust gas flow rate remain relatively low.

After $t_2$ and prior to $t_3$, the regeneration continues. The PF load continues to decrease toward the threshold PF load. The exhaust gas temperature remains greater than the threshold oxygen facilitated regeneration temperature due to the active controls remaining on. The exhaust gas flow rate and the $NO_2$ released remain relatively low.

At $t_3$, the PF load falls below the threshold PF load and as a result, the active controls are deactivated shortly after $t_3$ once the PF load falls to a sufficiently low amount. Double headed arrow 532 shows a duration of time the active controls were used for the oxygen facilitated regeneration. The exhaust gas temperature begins to decrease. The exhaust gas flow and the $NO_2$ released remain relatively low.

After $t_3$ and prior to $t_4$, the exhaust gas temperature decreases to a temperature less than the threshold oxygen and $NO_2$ facilitated regeneration temperatures. However, the PF load continues to decrease. This may be due to a "self-burn" wherein the soot on the filter has already ignited and continues to burn in the absence of hot exhaust gas temperatures. Thus, the PF load continues to decrease to a relatively low amount. The active controls remain deactivated since a regeneration is not demanded. The exhaust gas flow rate begins to increase slightly toward the lower threshold flow rate. The $NO_2$ released remains relatively low.

At $t_4$, the exhaust gas temperature is relatively low and is substantially equal to the exhaust gas temperature prior to $t_1$. The exhaust gas flow increases beyond the lower threshold flow rate while remaining below the upper threshold flow rate. As such, the $NO_2$ released begins to increase. The PF load begins to increase toward the threshold PF load. The active controls remain off due to a regeneration demand being absent.

After $t_4$ and prior to $t_5$, the exhaust gas flow rate continues to increase while remaining between the lower and upper threshold flow rate. As such, the $NO_2$ released continues to increase toward the threshold $NO_2$ regeneration amount. The PF load continues to increase toward the threshold PF load. The active controls remain off and the exhaust gas temperature remains substantially low.

At $t_5$, the PF load increases to a load greater than the threshold PF load. Serendipitously, the $NO_2$ released from the aftertreatment device exceeds the threshold $NO_2$ regeneration amount. Additionally, the exhaust gas flow rate remains between the lower and upper threshold exhaust gas flow rates. As such, the active controls are activated to increase the exhaust gas temperature from a relatively low temperature to the threshold $NO_2$ facilitated regeneration temperature.

After $t_5$ and prior to $t_6$, the exhaust gas increases toward the threshold $NO_2$ facilitated regeneration temperature. As such, the regeneration facilitated by $NO_2$ does not yet occur despite the exhaust flow being between the lower and upper threshold exhaust gas flow rates and $NO_2$ released being greater than the threshold $NO_2$ regeneration amount. The PF load continues to increase.

At $t_6$, the exhaust gas temperature exceeds the threshold $NO_2$ facilitated regeneration temperature. This, in combination with the $NO_2$ released being greater than the threshold $NO_2$ regeneration amount initiates the PF regeneration. As such, the PF load decreases toward the threshold PF load. The exhaust gas flow remains between the lower and upper threshold flow rates and the active controls remain on.

In some examples, active controls during regeneration facilitated by $NO_2$ further include adjusting exhaust gas flow rates. For example, if the exhaust gas flow rate is less than the lower threshold flow rate, then the active control includes increasing an engine rotation per minute to increase exhaust gas flow. Alternatively, if the exhaust gas flow rate is greater than the upper threshold flow rate, then the active control includes decreasing an engine rotation per minute and/or increasing EGR. It will be appreciated that the active controls may include adjusting other engine operating parameters to achieve the desired exhaust gas flow rate between the lower and upper threshold exhaust gas flow rates.

After $t_6$ and prior to $t_7$, the PF load continues to decrease toward the threshold PF load. The $NO_2$ released remains above the threshold $NO_2$ facilitated regeneration amount. The exhaust gas temperature remains above the threshold $NO_2$ facilitated regeneration temperature. The exhaust gas flow remains between the lower and upper threshold flow rates. The active controls remain active to ensure the exhaust temperature remains above the threshold $NO_2$ facilitated regeneration temperature.

At $t_7$, the PF load decreases to a load less than the threshold PF load and in response, the active controls are deactivated shortly after $t_7$ once the PF load falls to a sufficiently low amount. Double headed arrow 534 indicates a duration of time the active controls were used for the $NO_2$ facilitated regeneration. As shown, the double headed arrow 534 is shorter than the double headed arrow 532. In this way, the active controls during the $NO_2$ facilitated regeneration consume less fuel than the active controls during the oxygen facilitated regeneration. This may be due to the lower threshold temperature of the $NO_2$ facilitated regeneration compared to the oxygen facilitated regeneration. The $NO_2$ released remains above the threshold $NO_2$ facilitated regeneration amount. The exhaust flow remains between the upper and lower threshold flow rates. The exhaust gas temperature begins to decrease toward the threshold $NO_2$ facilitated regeneration temperature.

After $t_7$, the exhaust temperature decreases to a temperature less than the threshold $NO_2$ facilitated regeneration temperature. The exhaust gas flow remains between the lower and upper threshold exhaust gas flow rates. The active controls are off. The $NO_2$ released remains greater than the threshold $NO_2$ facilitated regeneration amount. The soot on the particulate filter continues to burn and the PF load decreases toward a relatively low PF load.

Turning now to FIG. 6, it shows a plot 600 for controlling active regenerations of a particulate filter located downstream of a DOC with nitrogen oxide releasing capabilities (e.g., such as aftertreatment device 70 of FIG. 1). In one example, the operational sequence is based on operation of method 400 of FIG. 4 including components from engine system 100 of FIG. 1. However, the plot 600 does not include passive regeneration conditions for reasons of brevity. Plot 600 includes an exhaust gas temperature (line 610), a threshold $NO_2$ facilitated regeneration temperature (dashed line 612), and a threshold oxygen facilitated regeneration temperature (dashed line 614). The plot 600 further includes an amount of $NO_2$ released (line 620), a threshold $NO_2$ regeneration amount (dashed line 622), a particulate filter load (line 630), a threshold particulate load (dashed line 632), total fueling (line 640), and driver demand fueling (dashed line 642). In one example, the PF load represents a PF load on the PF 72 of FIG. 1. The total fueling represents an amount of fueling based on a combination of driver demand and active controls. As such, the total fueling and driver demand fueling are substantially equal when active controls are off. Time increases from a left to a right side of the figure.

The threshold regeneration amount 622 is depicted as a dynamic value in plot 600, whereas the threshold regeneration amount 542 of plot 500 of FIG. 5 is static. Plot 500 does not depict an amount of fueling, as such, the threshold regeneration amount 542 is depicted as a fixed value for reasons of simplicity. However, the threshold $NO_2$ regeneration amount 622 represents a threshold $NO_2$ regeneration amount based on a stoichiometric equivalence of carbon containing compounds released into the exhaust passage (e.g., exhaust passage 48 of FIG. 1).

Prior to $t_1$, the exhaust gas temperature is relatively low. Specifically, the exhaust gas temperature (line 610) is lower than the threshold $NO_2$ facilitated regeneration temperature (line 612), which is lower than the threshold oxygen facilitated regeneration temperature (line 614). The $NO_2$ released (line 620) is less than the threshold $NO_2$ regeneration amount. The PF load (line 630) increases toward the threshold particulate load (line 632). Total fueling (line 640) is substantially equal to driver demand fueling (line 642). In this way, fueling is based on a throttle position, which is based on an accelerator position (e.g., driver demand). Thus, active controls are off.

At $t_1$, the PF load is greater than the threshold particulate load. As such, a backpressure measured upstream of the PF is greater than a threshold backpressure, wherein the threshold backpressure may be based on a pressure capable of decreasing engine power output. However, the exhaust gas temperature remains less than the threshold $NO_2$ and oxygen facilitated regeneration temperatures. Since the $NO_2$ released is less than the threshold $NO_2$ regeneration amount, the active controls initiated are configured to increase fueling to increase the exhaust gas temperature to a temperature higher than the threshold oxygen facilitated regeneration temperature. As such, total fueling increases to a fueling greater than the driver demand. This may include running rich (e.g., air/fuel ratio less than 1). Alternatively, the active controls may active a fuel injector located in an exhaust passage downstream of the engine and upstream of the aftertreatment device, as described above. Fueling from the fuel injector may be based on a difference between a current exhaust gas temperature and a desired exhaust gas temperature, wherein the fueling increases as the difference increases.

After $t_1$ and before $t_2$, the total fueling increases, which results in the threshold $NO_2$ regeneration amount to correspondingly increase and the exhaust temperature to increase to a temperature greater than the threshold oxygen facilitated regeneration temperature. At $t_2$, the regeneration is initiated and the PF load decreases. The active controls remain on and the total fueling is greater than the driver demand fueling.

After $t_2$ and prior to $t_3$, the regeneration continues and the PF load decreases to a load less than the threshold particulate load. As such, the backpressure measured upstream of the PF is less than the threshold backpressure. At $t_3$, the active controls are deactivated and the total fueling decreases back toward driver demand fueling. The threshold $NO_2$ regeneration amount decreases toward the $NO_2$ released. The particulate filter load continues to decrease due to a self-burn.

After $t_3$ and prior to $t_4$, the PF load is less than the threshold particulate load and is relatively low. The $NO_2$ released is less than the threshold $NO_2$ regeneration amount. The exhaust gas temperature is relatively low and less than the threshold $NO_2$ and oxygen regeneration temperatures. The total fueling decreases and is substantially equal to the driver demand fueling. As such, active controls are deactivated.

At $t_4$, the PF load is no longer self-burning. As such, the PF load begins to increases toward the PF load threshold. After $t_4$ and prior to $t_5$, the PF load continues to increase. The exhaust gas temperature remains relatively low. The $NO_2$ released increases to an amount of $NO_2$ greater than the threshold $NO_2$ regeneration amount. In one example, the $NO_2$ released increases due to a decrease in EGR flowing to the engine. The total fueling is substantially equal to the driver demand fueling.

At $t_5$, the PF load is greater than the threshold PF load. As such, a regeneration is demanded. However, the exhaust gas temperature is less than the threshold $NO_2$ and oxygen facilitated regeneration temperatures. As such, active controls are activated. However, the active controls initiated are less intrusive due to the $NO_2$ released being greater than the threshold $NO_2$ regeneration amount. As such, a temperature increase desired to perform the regeneration is lower than that at $t_1$. After $t_5$ and prior to $t_6$, the total fueling increases. However, a magnitude of the increase is less than the increase between $t_1$ and $t_2$. As such, initiating an active regeneration of the PF when the $NO_2$ released is greater than the threshold $NO_2$ regeneration amount conserves more fuel than the active regeneration when $NO_2$ released is less than the threshold NO$_2$ regeneration amount. The exhaust temperature increases and is greater than the threshold NO$_2$ regeneration temperature and less than the threshold oxygen regeneration temperature.

At $t_6$, the regeneration begins and the PF load begins to decrease. The total fueling remains above the driver demand fueling. The exhaust temperature remains sufficiently hot enough to regenerate in the presence of an amount of NO$_2$ greater than the threshold NO$_2$ facilitated regeneration amount. After $t_6$ and prior to $t_7$, the PF load decreases to a load less than the threshold particulate load. As such, active controls are deactivated and the total fueling decreases toward the driver demand fueling. The NO$_2$ released remains relatively high and greater than the threshold NO$_2$ facilitated regeneration amount. The exhaust gas temperature remains at a temperature greater than the threshold NO$_2$ regeneration temperature.

At $t_7$, the exhaust gas temperature decreases as the total fueling decreases. The PF load continues to decrease. The NO$_2$ released remains above the threshold NO$_2$ facilitated regeneration amount. After $t_7$, the exhaust gas temperature is less than the threshold NO$_2$ regeneration temperature. However, the PF load continues to decrease due to self-burn. The total fueling decrease to be substantially equal to the driver demand fueling. Likewise, the threshold NO$_2$ facilitated regeneration amount decreases.

In this way, an aftertreatment device is configured to decrease regeneration temperatures for a particulate filter, thereby decreasing fuel consumption when active controls are desired. The device comprises a washcoat with a support, one or more precious metals, and one or more base metals. The precious and base metals may allow the device to maintain reactivity despite being exposed to sulfur dioxide, while increasing NO oxidation efficiency. The technical effect of combining base and precious metals is to increase the longevity of the device while also improving its reactivity. By doing this, regeneration temperatures are decreased in a sufficient presence of NO$_2$, which may increase fuel economy and provide monetary savings to a vehicle operator.

An example of a method comprising generating NO$_2$ in a catalyst comprising a washcoat with zirconium, one or more base metal oxides, and a precious metal, with an exhaust gas flow rate being between lower and upper threshold flow rates and facilitating a regeneration of a particulate filter located downstream of the catalyst via NO$_2$ when an exhaust gas temperature is greater than a threshold temperature. A first example of the method further includes where threshold temperature is a threshold NO$_2$ facilitated regeneration temperature, and where the threshold NO$_2$ facilitated regeneration temperature is based on the particulate filter being exposed to an amount of NO$_2$ capable of facilitating a regeneration of the particulate filter. A second example of the method, optionally including the first example further includes where regenerating the particulate filter in response to the exhaust gas temperature being less than the threshold temperature includes initiating active controls to adjust engine operating parameters to increase the exhaust gas temperature. A third example of the method, optionally including the first and/or second examples further includes where the active controls include one or more of decreasing an EGR flow rate, increasing a fuel injection pressure, increasing a fuel injection volume, decreasing an air/fuel ratio, increasing manifold pressure, and retarding a fuel injection. A fourth example of the method, optionally including one or more of the first through third examples, further includes where the regeneration is facilitated by NO$_2$ when an amount of NO$_2$ produced by an engine and the catalyst is greater than a threshold NO$_2$ regeneration amount. A fifth example of the method, optionally including one or more of the first through fourth examples, further includes where the base metal oxides are in the range of 30 to 70 weight percent of the washcoat. A sixth example of the method, optionally including one or more of the first through fifth examples, further includes where generating NO$_2$ includes flow exhaust gas through the catalyst and where the exhaust gas flows at an exhaust gas flow rate between upper and lower exhaust gas thresholds and where the exhaust gas temperature is greater than 200° C.

An example system comprising a catalyst located in an exhaust passage of an engine driven vehicle, where the catalyst comprises a washcoat having a zirconium oxide support, one or more base metal oxides and at least a precious metal, a particulate filter located in a position of the exhaust passage downstream of the catalyst relative to a direction of exhaust gas flow, and a controller with computer readable instructions stored thereon that enable the controller to actively regenerate the particulate filter via adjusting an actuators to increase an exhaust gas temperature to a temperature greater than a threshold temperature and adjust an exhaust gas flow rate to a rate between upper and lower threshold exhaust gas flow rates. A first example of the system further includes where threshold temperature is a threshold NO$_2$ facilitated regeneration temperature and where the threshold NO$_2$ facilitated regeneration temperature is lower than a threshold oxygen facilitated regeneration temperature. A second example of the system, optionally including the first example, further includes where the threshold NO$_2$ facilitated regeneration temperature is determined based on a regeneration temperature of the particulate filter in the presence of NO$_2$ being greater than a threshold amount of NO$_2$, and where the threshold oxygen facilitated regeneration temperature is based on a regeneration temperature of the particulate filter in the presence of an amount of NO$_2$ being less than the threshold amount of NO$_2$. A third example of the system, optionally including the first and/or second examples, further includes where the catalyst is physically coupled to the exhaust passage, and where exhaust gas from the engine flows through the catalyst before flowing into the particulate filter. A fourth example of the system, optionally including one or more of the first through third examples, further includes where a selective catalytic reduction device located downstream of the particulate filter.

An example of a method for an engine driven vehicle comprising regenerating a particulate filter without adjusting engine operating parameters during a first mode, facilitating a particulate filter regeneration with oxygen by adjusting engine operating parameters to a first magnitude during a second mode, and facilitating the particulate filter with NO$_2$ by adjusting engine operating parameters to a second magnitude during a third mode, where the NO$_2$ is produced by at least a diesel oxidation catalyst located upstream of the particulate filter, where the diesel oxidation catalyst comprises a washcoat having a zirconium oxide substrate and at least a manganese oxide and a palladium catalyst; where the first magnitude is greater than the second magnitude. A first example of the method further includes where the regeneration is passively facilitated by oxygen when an exhaust gas temperature is greater than a threshold oxygen facilitated regeneration temperature, an amount of NO$_2$ at the filter is less than a threshold regeneration amount, and an exhaust gas flow rate is outside of a range between upper and lower threshold flow rates during the first mode. A second example of the method, optionally including the first example, further includes where the regeneration is passively facilitated by $NO_2$ when an exhaust gas temperature is greater than a threshold $NO_2$ facilitated regeneration temperature, an amount of $NO_2$ at the filter is greater than a threshold $NO_2$ regeneration amount, and an exhaust gas flow rate is within a range between upper and lower threshold flow rate during the first mode. A third example of the method, optionally including the first and/or second examples, further includes where the particulate filter regeneration during the second mode includes initiating active controls configured to adjust engine operating parameters by the first magnitude, wherein the first magnitude corresponds to increasing an exhaust gas temperature to a temperature greater than a threshold oxygen facilitated regeneration temperature, and where the threshold oxygen facilitated regeneration temperature is equal to 600° C., and where an amount of $NO_2$ at the particulate filter is less than a threshold $NO_2$ regeneration amount. A fourth example of the method, optionally including one or more of the first through third examples, further includes where the particulate filter regeneration during the third mode includes initiating active controls configured to adjust engine operating parameters by the second magnitude, wherein the second magnitude corresponds to increasing an exhaust gas temperature to a temperature greater than a threshold $NO_2$ facilitated regeneration temperature, and where the threshold $NO_2$ facilitated regeneration temperature is equal to 350° C., and where an amount of $NO_2$ at the particulate filter is greater than a threshold $NO_2$ regeneration amount. A fifth example of the method, optionally including one or more of the first through fourth examples, further includes where the threshold $NO_2$ regeneration amount corresponds to an amount of $NO_2$ sufficient to promote burning of soot stored on the particulate filter. A sixth example of the method, optionally including one or more of the first through fifth examples, further includes where the catalyst is hermetically sealed along its outer circumference to an exhaust pipe of an exhaust passage. A seventh example of the method, optionally including one or more of the first through sixth examples, further includes where the catalyst receives exhaust gas through the exhaust passage before the particulate filter.

An example of a method for treating emissions from diesel combustion comprising passing diesel combustion exhaust gas over a diesel oxidation catalyst having a washcoat comprising zirconium oxide, palladium oxide and at least one base metal oxide, the washcoat is coated on a surface of a substrate, and where the palladium oxide is 0.5-3 weight percent of the washcoat. A first example of the method further includes where the zirconium oxide is $ZrO_2$. A second example of the method, optionally including the first example, further includes where the palladium oxide is PdO. A third example of the method, optionally including the first and/or second examples, further includes where the at least one base metal oxide includes one or more of $Mn_2O_3$, $CeO_2$, and CuO. A fourth example of the method, optionally including one or more of the first through third examples, further includes where the percent weight of the at least one base metal oxide in the washcoat is 15 to 75. A fifth example of the method, optionally including one or more of first through fourth examples, further includes where the diesel oxidation catalyst is upstream of a particulate filter relative to a direction of exhaust gas flow. A sixth example of the method, optionally including one or more of first through fifth examples, further includes where the particulate filter is upstream of a selective catalytic reduction device. A seventh example of the method, optionally including one or more of the first through sixth examples, further includes where the diesel oxidation catalyst is a first diesel oxidation catalyst upstream of a second diesel oxidation catalyst relative to a direction of exhaust gas flow, and where a selective catalytic reduction device is located between the first and second diesel oxidation catalysts, and where a particulate filter is located downstream of the second diesel oxidation catalyst. An eighth example of the method, optionally including one or more of the first through seventh examples, further includes where the first and second diesel oxidation catalysts are identical. A ninth example of the method, optionally including one or more of the first through eighth examples, further includes where the first diesel oxidation catalyst comprises different types of base metal oxides than the second diesel oxidation catalyst.

An example of a diesel oxidation catalyst comprising a cordierite substrate with a honeycomb shape, a washcoat having $ZrO_2$, PdO, and one or more base metal oxides is applied to the substrate, where a PdO portion is upstream of the base metal oxides coated on the substrate relative to a direction of exhaust gas flow, the base metal oxides comprising $Mn_2O_3$, $CeO_2$, and CuO, wherein a weight percent of the base metal oxides is between 15-75%. A first example of the catalyst further includes where the washcoat comprises a weight percent of PdO of exactly 2 and the weight percent of the $Mn_2O_3$, $CeO_2$, and CuO is exactly 50.

An example of a diesel engine comprising an exhaust passage housing a diesel oxidation catalyst upstream of a particulate filter and a selective catalytic reduction device, the diesel oxidation catalyst comprises a substrate coated with a washcoat having $ZrO_2$, PdO, and a plurality of base metal oxides, where the PdO is applied to an upstream portion of the substrate and the plurality of base metal oxides is applied to a downstream portion of the substrate relative to a direction of exhaust gas flow. A first example of the diesel engine further includes where the upstream portion is configured to oxidize carbon containing compounds and where the downstream portion is configured to oxidize nitrogen oxides. A second example of the diesel engine, optionally including the first example, further includes where the diesel oxidation catalyst is fixedly located in the exhaust passage. A third example of the diesel engine, optionally including the first and/or second examples, further includes where the diesel oxidation catalyst is upstream of a particulate filter such that exhaust gas flow through the diesel oxidation catalyst before it reaches the particulate filter. A fourth example of the diesel engine, optionally including one or more of the first through third examples, further includes where the plurality of base metal oxides includes oxides of Co, Cu, Ce, Mn, Ni, Fe, Mo, and W. A fifth example of the diesel engine, optionally including one or more of the first through fourth examples, further includes where the plurality of base metal oxides includes exactly three base metal oxides including $Mn_2O_3$, $CeO_2$, and CuO. A sixth example of the diesel engine, optionally including one or more of the first through fifth examples, further includes where the diesel oxidation catalyst is located downstream of an EGR passage. A seventh example of the diesel engine, optionally including one or more of the first through sixth examples further includes where the diesel oxidation catalyst is upstream and downstream portions are in face-sharing contact.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-8, V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
generating $NO_2$ in a catalyst comprising a washcoat with zirconium, one or more base metal oxides, and a palladium oxide, with an exhaust gas flow rate being between lower and upper threshold flow rates; and
facilitating a regeneration of a particulate filter located downstream of the catalyst via $NO_2$ when an exhaust gas temperature is greater than a threshold temperature; where
the palladium oxide is contained in an upstream portion of the catalyst relative to a direction of exhaust gas flow; and
the one or more base metal oxides are contained in a downstream portion of the catalyst relative to the direction of exhaust gas flow.

2. The method of claim 1, wherein the threshold temperature is a threshold $NO_2$ facilitated regeneration temperature, and where the threshold $NO_2$ facilitated regeneration temperature corresponds to the regeneration occurring in a presence of an amount of $NO_2$ greater than a threshold $NO_2$ regeneration amount.

3. The method of claim 1, further including regenerating the particulate filter in response to the exhaust gas temperature being less than the threshold temperature by initiating active controls to adjust engine operating parameters to increase the exhaust gas temperature.

4. The method of claim 3, wherein the active controls include one or more of decreasing an EGR flow rate, increasing a fuel injection pressure, increasing a fuel injection volume, decreasing an air/fuel ratio, increasing an intake manifold pressure, and retarding a fuel injection.

5. The method of claim 1, wherein the regeneration is facilitated by $NO_2$ when an amount of $NO_2$ produced by an engine and the catalyst is greater than a threshold $NO_2$ regeneration amount.

6. The method of claim 1, wherein the one or more base metal oxides are in a range of 15 to 75 weight percent of the washcoat.

7. The method of claim 1, wherein generating $NO_2$ includes flowing exhaust gas through the catalyst and where the exhaust gas temperature is greater than 200° C.

8. A method for an engine driven vehicle, comprising:
regenerating a particulate filter without adjusting engine operating parameters during a first mode;
facilitating the particulate filter regeneration with oxygen by adjusting the engine operating parameters to increase an exhaust gas temperature by a first magnitude during a second mode, where an exhaust gas flow rate is lower than a lower threshold flow rate; and
facilitating the particulate filter regeneration with $NO_2$ by adjusting the engine operating parameters to increase the exhaust gas temperature by a second magnitude during a third mode, where the $NO_2$ is produced by at least a diesel oxidation catalyst located upstream of the particulate filter, where the diesel oxidation catalyst comprises a washcoat having a zirconium oxide substrate and at least a manganese oxide and a palladium oxide, and where the exhaust gas flow rate is within a range between the lower threshold flow rate and an upper threshold flow rate; where
the first magnitude is greater than the second magnitude.

9. The method of claim 8, wherein the particulate filter regeneration is passively facilitated by oxygen when the exhaust gas temperature is greater than a threshold oxygen facilitated regeneration temperature, an amount of $NO_2$ at the particulate filter is less than a threshold $NO_2$ regeneration amount, and the exhaust gas flow rate is outside of the range between the lower and upper threshold flow rates during the first mode.

10. The method of claim 8, wherein the particulate filter regeneration is passively facilitated by $NO_2$ when the exhaust gas temperature is greater than a threshold $NO_2$ facilitated regeneration temperature, an amount of $NO_2$ at the particulate filter is greater than a threshold $NO_2$ regeneration amount, and the exhaust gas flow rate is within the range between the lower and upper threshold flow rates during the first mode.

11. The method of claim 8, wherein the particulate filter regeneration during the second mode includes initiating active controls configured to adjust the engine operating parameters to increase the exhaust gas temperature by the first magnitude, wherein increasing the exhaust gas temperature by the first magnitude corresponds to increasing the exhaust gas temperature to a temperature greater than a threshold oxygen facilitated regeneration temperature, and where the threshold oxygen facilitated regeneration temperature is equal to 600° C., and where an amount of $NO_2$ at the particulate filter is less than a threshold $NO_2$ regeneration amount.

12. The method of claim 8, wherein the particulate filter regeneration during the third mode includes initiating active controls configured to adjust the engine operating parameters to increase the exhaust gas temperature by the second magnitude, wherein increasing the exhaust gas temperature by the second magnitude corresponds to increasing the exhaust gas temperature to a temperature greater than a threshold $NO_2$ facilitated regeneration temperature, and where the threshold $NO_2$ facilitated regeneration temperature is equal to 300° C., and where an amount of $NO_2$ at the particulate filter is greater than a threshold $NO_2$ regeneration amount.

13. The method of claim 12, wherein the threshold $NO_2$ regeneration amount corresponds to an amount of $NO_2$ sufficient to promote burning of soot stored on the particulate filter.

14. The method of claim 8, wherein the diesel oxidation catalyst is hermetically sealed along an outer circumference of the diesel oxidation catalyst to an exhaust pipe of an exhaust passage.

15. The method of claim 14, wherein the diesel oxidation catalyst receives exhaust gas through the exhaust passage before the particulate filter.

16. The method of claim 8, where the palladium oxide is applied to an upstream portion of the zirconium oxide substrate relative to a direction of exhaust gas flow, and the manganese oxide is applied to a downstream portion of the zirconium oxide substrate relative to the direction of exhaust gas flow.

* * * * *